US006932291B2

(12) United States Patent
Chang

(10) Patent No.: US 6,932,291 B2
(45) Date of Patent: Aug. 23, 2005

(54) SPINNING REEL

(75) Inventor: Liang-Jen Chang, Taiping (TW)

(73) Assignee: Okuma Fishing Tackle Co., Ltd., Taiping (TW)

( * ) Notice: Subject to any disclaimer, the term of this patent is extended or adjusted under 35 U.S.C. 154(b) by 0 days.

(21) Appl. No.: 10/693,081

(22) Filed: Oct. 27, 2003

(65) Prior Publication Data

US 2005/0087639 A1 Apr. 28, 2005

(51) Int. Cl.[7] .............................................. A01K 89/01
(52) U.S. Cl. ...................................... 242/249; 242/311
(58) Field of Search ............................... 242/249, 224, 242/311, 312, 319; D22/140

(56) References Cited

U.S. PATENT DOCUMENTS 4,353,514 A * 10/1982 Neufeld ...................... 242/311
4,359,196 A * 11/1982 Puryear ...................... 242/311
5,350,130 A * 9/1994 Hitomi et al. .............. 242/241
5,540,397 A 7/1996 Yoshikawa
6,102,315 A * 8/2000 Sato ........................... 242/249
6,149,089 A * 11/2000 Matsuda ..................... 242/319
6,457,662 B1 * 10/2002 Sato ........................... 242/247
6,629,655 B2 * 10/2003 Kitajima ..................... 242/311
2003/0146324 A1 * 8/2003 Yeh ............................ 242/311

FOREIGN PATENT DOCUMENTS

DE 10024066 A 4/2001
EP 0750841 A 1/1997
EP 1332672 A 8/2003
GB 2234852 A * 9/1993 ................. 242/311

* cited by examiner

*Primary Examiner*—Emmanuel M Marcelo
(74) *Attorney, Agent, or Firm*—Browdy and Neimark, P.L.L.C.

(57) ABSTRACT

A spinning reel includes a hollow reel body having an axle hole, a transverse hole and an opening. The reel body has a connection portion to couple the reel body to a fishing rod. A drive mechanism is mounted inside the reel body and has an input portion running out of the reel body through the transverse hole and an output portion running out of the reel body through the axle hole. The drive mechanism has a portion, such as a portion of a gear or a guiding device, received in the opening. A handle is coupled with the input portion for driving the drive mechanism. A rotor is coupled with the output portion of the drive mechanism for rotation. A spool is coupled with the output portion of the drive mechanism for reciprocation. A cover is mounted on the reel body to shield the opening.

3 Claims, 3 Drawing Sheets

10 20 28 24 32 29 23 31 25 48

SPINNING REEL

BACKGROUND OF THE INVENTION

1. Field of the Invention

The present invention relates generally to a fishing tool, and more particularly to a spinning reel, which is smaller in size, simpler in structure and convenient in use.

2. Description of the Related Art

A conventional spinning reel of the fishing rod has a reel body, a drive mechanism mounted in the reel body, a handle mounted on the reel body to drive the drive mechanism, a spool mounted in the reel body to be driven by the drive mechanism for reciprocating motion, and a cover mounted on the reel body to shield the elements in or on the reel body. The drive mechanism consists of gears, shafts and guiding devices and so on. While the drive mechanism works, the gears are rotating and the shafts and guiding devices are reciprocating such that the reel body must have a sufficient space inside for the motions taken by the elements mounted therein. The conventional spinning reel, therefore, has a larger size that makes the weight of the reel increased and inconvenient in use.

SUMMARY OF THE INVENTION

The primary objective of the present invention is to provide a spinning reel, which is simpler in structure and convenient in use.

According to the objective of the present invention, a spinning reel comprises a reel body, which is hollow inside, having an axle hole, a transverse hole and an opening. A drive mechanism is mounted inside the reel body and having an input portion running out of the reel body through the transverse hole and an output portion running out of the reel body through the axle hole. The drive mechanism has at least a portion thereof received in the opening. A handle is coupled with the input portion of the drive mechanism to drive the drive mechanism working. A rotor is coupled with the output portion of the drive mechanism to be driven by the drive mechanism for rotation. A spool is coupled with the output portion of the drive mechanism to be driven by the drive mechanism for reciprocation. A cover is mounted on the reel body to shield the opening.

DETAILED DESCRIPTION OF THE INVENTION

Figure 1:
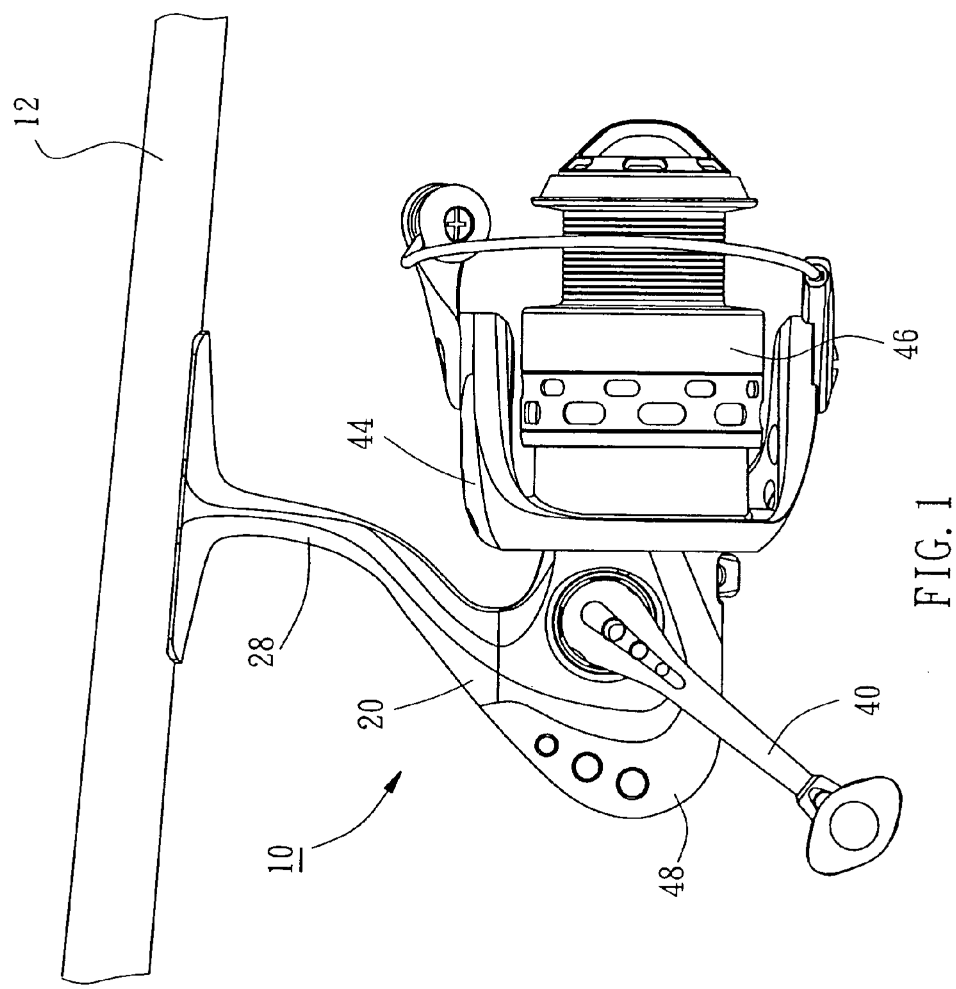
FIG. 1 is a front view of a preferred embodiment of the present invention.
Figure 2:
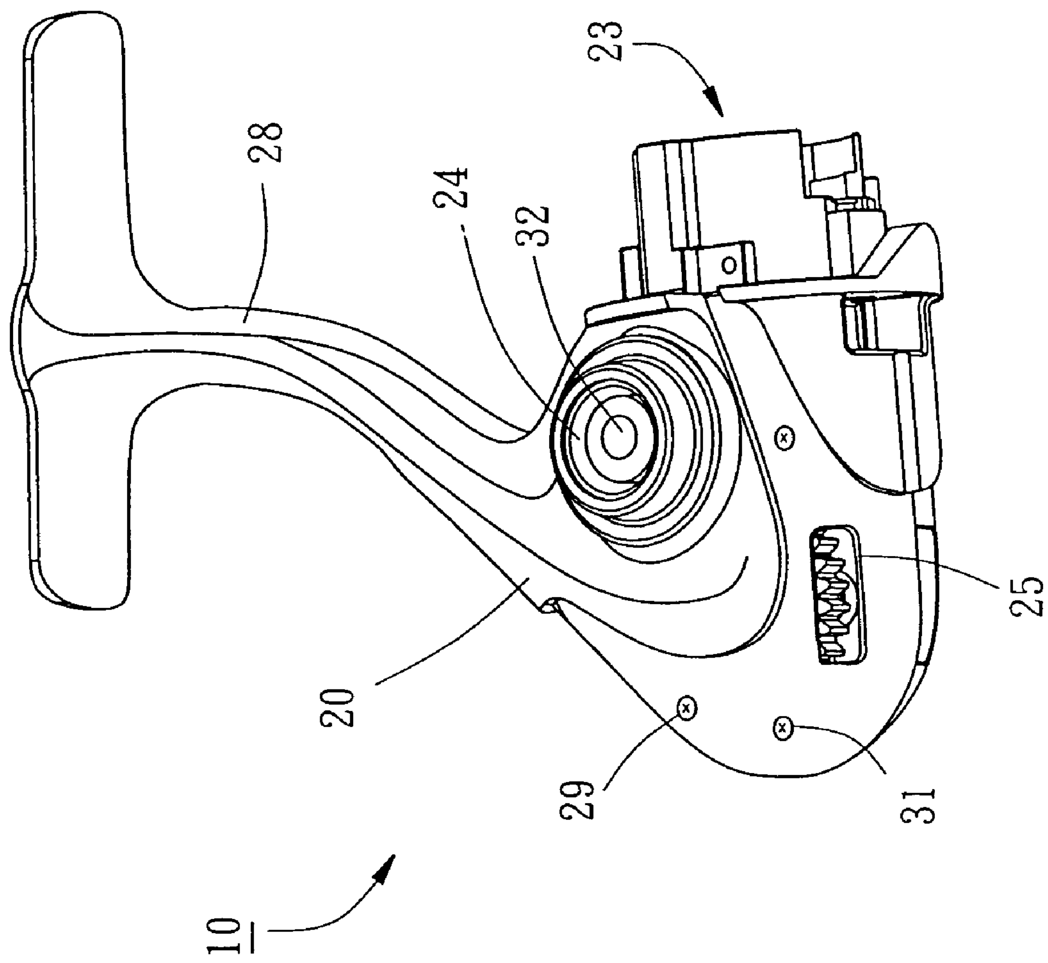
FIG. 2 is a partial exploded view of the preferred embodiment of the present invention.
Figure 2:
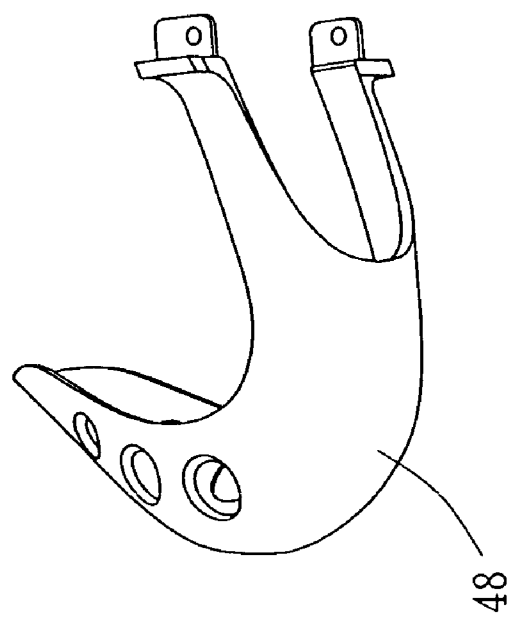
Figure 3:
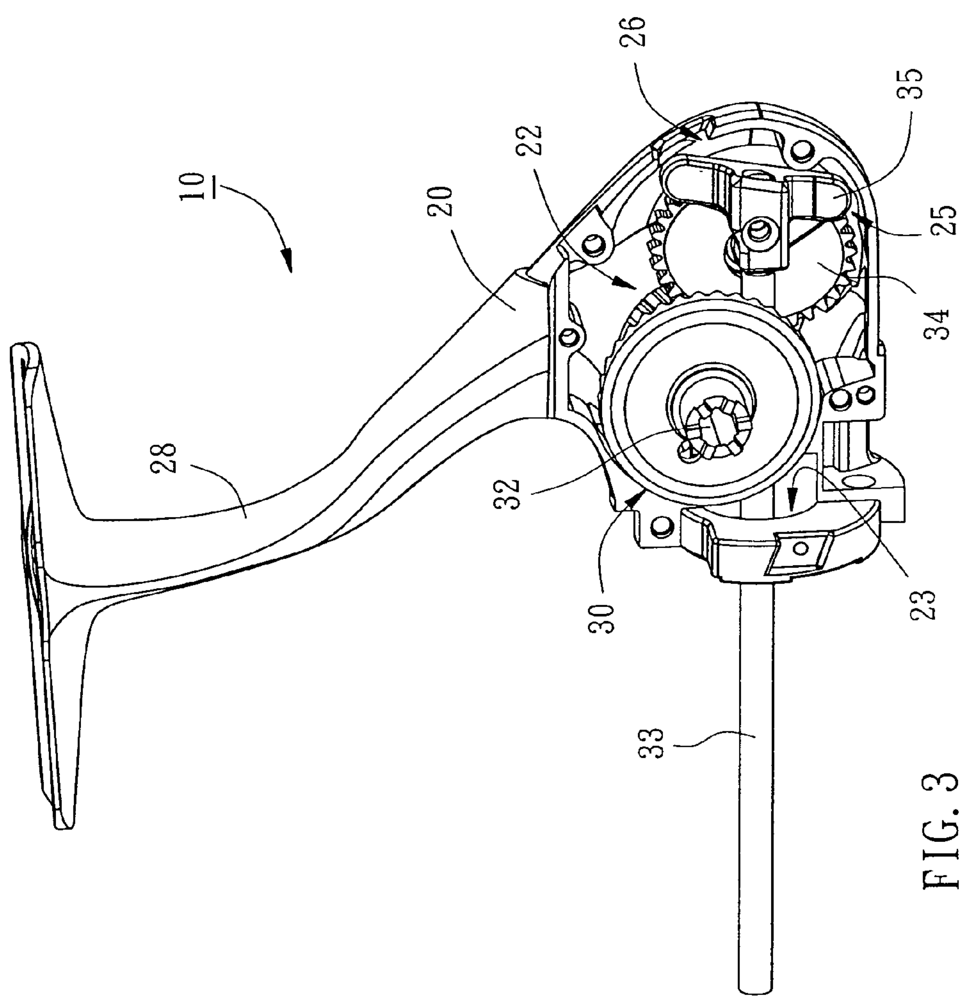
FIG. 3 is a schematic view of the preferred embodiment of the present invention, showing the detail of the drive mechanism.

As shown in FIGS. from FIG. 1 to FIG. 3, a spinning reel 10 of the preferred embodiment of the present invention mainly comprises a reel body 20, a drive mechanism 30, a handle 40, a rotor 44, a spool 46 and a cover 48, wherein The reel body 20 is hollow so that it has a chamber 22 inside. The reel body 20 has an axle hole 23, a transverse hole 24, a first opening 25 and a second opening 26. The reel body 20 has a connection portion 28 to couple the reel body 20 to a fishing rod 12. The reel body 20 further is provided with bolts 29 thereon for fastening.

The drive mechanism 30 is received and fixed in the chamber 22 of the reel body 20 by bolts 31. The drive mechanism 30 has an input portion 32 running out of the reel body 20 through the transverse hole 24, an output portion, i.e. a spindle 33, running out of the reel body 20 through the axle hole 23, gears 34 meshed with each other and a guiding device 35 disposed between the input portion 32 and the output portion 33. The guiding device 35 has an elongated slot (not shown) at a side thereof to be engaged with a post (not shown) on the gear 34 such that rotation of the gears 34 will drive the guiding device reciprocally. The spindle 33 is coupled with the guiding device 35 for reciprocating motion along with the guiding device. The drive mechanism 30 is a well-known prior art, which is taught by many inventions that the one skilled in the art can find the detail easily.

The handle 40 is coupled with the input portion 32 of the drive mechanism 30 to drive the drive mechanism 30 to operate. The rotor 44 is coupled with the output portion 33 for rotation. The spool 46 is coupled with the output portion (the spindle) 33 of the drive mechanism 30 for reciprocating motion. The cover 48 is mounted on the reel body 20 to shield the openings 25 and 26 and the exposed bolts 29 and 31.

The main improvement of the present invention is characterized in that the drive mechanism 30 has portions received in the openings 25 and 26 respectively. For example, the gear 34 has a bottom portion received in the first opening 25 and the guiding device 35 has a top portion received in the second opening 26 while the guiding device 35 is moved to the right side (shown in FIG. 3). Such design makes the size of the reel body 20 smaller, but it would not affect the reciprocating motion of the guiding device 35 and the spool 46.

The main scope of the present invention is that provides one or more openings on the reel body 20 and the drive mechanism 30 has at least a component (such as the gear or the guiding device) received in an opening. No matter what component of the drive mechanism 30 is received in the opening is the scope of the present invention.

What is claimed is:

1. A spinning reel, comprising:

a reel body, which is hollow inside, having an axle hole, a transverse hole and at least one opening, wherein the reel body has a connection portion to couple the reel body to a fishing rod;

a drive mechanism mounted inside the reel body having an input portion extending out of the reel body through the transverse hole, an output portion extending out of the reel body through the axle hole and a gear having at least a portion thereof received in the at least one opening;

a handle coupled with the input portion of the drive mechanism to drive the drive mechanism to operate;

a rotor coupled with the output portion of the drive mechanism to be driven by the drive mechanism for rotation;

a spool coupled with the output portion of the drive mechanism to be driven by the drive mechanism for reciprocation; and a cover mounted on the reel body to shield the at least one opening.

2. A spinning reel, comprising:

a reel body, which is hollow inside, having an axle hole, a transverse hole, a first opening and a second opening, wherein the reel body has a connection portion to couple the reel body to a fishing rod;

a drive mechanism mounted inside the reel body having an input portion running out of the reel body through the transverse hole, an output portion running out of the reel body through the axle hole, a gear and a guiding device, wherein the gear has at least a portion thereof received in the first opening and the guiding device has at least a portion thereof received in the second opening;

a handle coupled with the input portion of the drive mechanism to drive the drive mechanism to operate;

a rotor coupled with the output portion of the drive mechanism to be driven by the drive mechanism for rotation;

a spool coupled with the output portion of the drive mechanism to be driven by the drive mechanism for reciprocation; and a cover mounted on the reel body to shield the first opening and the second opening.

3. The spinning reel according to claim 1, wherein a rim of the gear is received in the at least one opening.

* * * * *